Oct. 6, 1970  RICHARD SHIH-TENG CHANG ET AL  3,532,914
INTEGRAL GOVERNOR FOR ELECTRIC MOTOR

Filed June 17, 1968

INVENTORS
RICHARD SHIH-TENG CHANG
EDMUND E. LANDSINGER
JOHN W. RYAN

By Seymour A. Scholnick
ATTORNEY

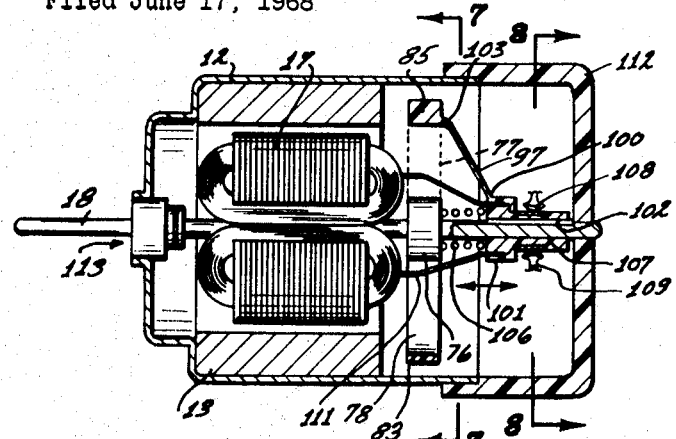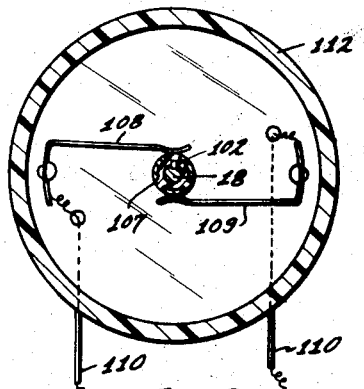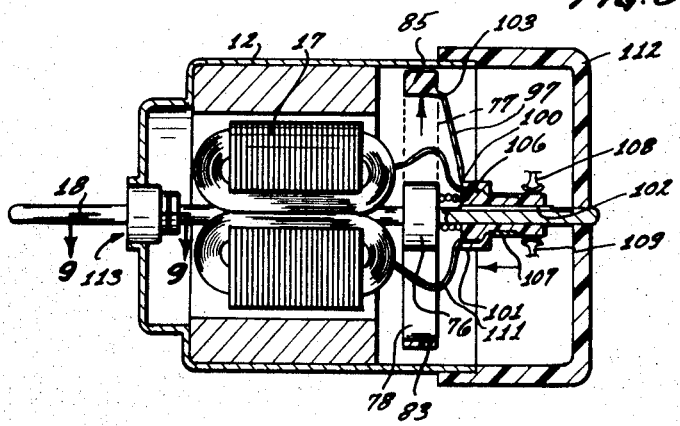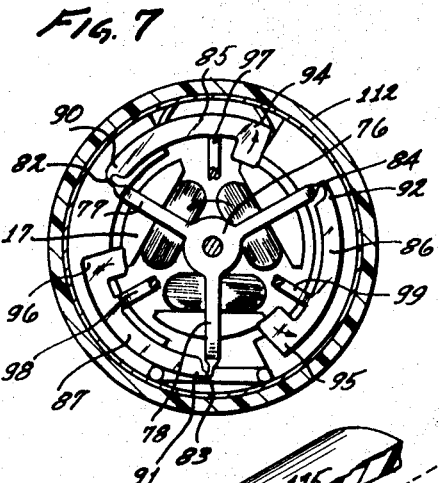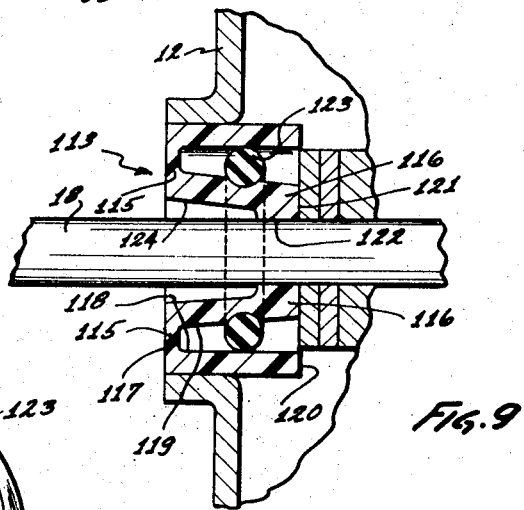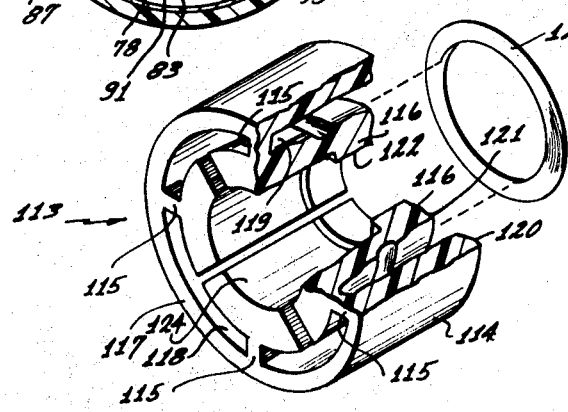

United States Patent Office 3,532,914
Patented Oct. 6, 1970

3,532,914
INTEGRAL GOVERNOR FOR ELECTRIC MOTOR
Richard Shih-Teng Chang, Gardena, Edmund E. Landsinger, Torrance, and John W. Ryan, Los Angeles, Calif., assignors to Mattel, Inc., Hawthorne, Calif., a corporation of Delaware
Filed June 17, 1968, Ser. No. 737,401
Int. Cl. H01r 39/42; H02k 13/00
U.S. Cl. 310—240
10 Claims

ABSTRACT OF THE DISCLOSURE

A centrifugal weight rotates with a motor rotor but is spring-urged inwardly. A commutator and brushes are provided, either of which may be rotatable, and the brushes are pressed lightly against the commutator by spring means separate from those acting on the centrifugal weight. When rotor speed moves the weight outwardly a predetermined amount, the weight functions to electrically separate the brushes and commutator.

BACKGROUND OF THE INVENTION

This invention is in the field of devices to control the speeds of electric motors. It also relates to a bearing for use in combination with a small motor for use in a toy as shown in the motor disclosed.

Recent prior art in motor governors is illustrated in United States Letters Patent No. 2,812,454 to Buck for "Electric Motor with Fixed Commutator." This patent shows centrifugally actuated weights on brushes which are rotated around a stationary commutator. By way of background, the present invention was made originally for a phonograph motor having approximately from one-thousandth to one-hundredth horsepower, the phonograph being adpted for use in a small toy. It was found that in successful operation of the invention in the integral governor to control speed of the motor, that the governor must be able to move the brushes off and on the commutator, between full and no power, approximately two hundred or three hundred times per second. It was with this type of operation that the present invention was found to be successful.

In experimentation, using the concept of applying the weights directly to the brushes as illustrated in the Buck patent, it was found that in small motors the movement of the brushes, on and off the commutator, occurred at a much slower rate and resulted in jerks and flutter in the motor shaft. It was found that it was difficult, if not impossible, to make at least two or all of the brushes to break contact with the commutator at the same time when the weights were on the individual brushes. The usual result was that one weighted brush would break contact first to cause a partial loss of power and in this situation, there being a time gap between the removal of the first and second brushes from the commutator by centrifugal action, the speed of the motor could not be made constant. It was thus found that the ability to cut off all or most of the power simultaneously in the motor, combined with a high switch rate, was the key to an effective governor.

It was also discovered that the greater the mass on the brushes, the greater the problem because the inertia imparted to the brushes by the weights causes the brushes to bounce on and off the commutator. In the present invention very light weight copper strip brushes are used and these permit the high switch rates indicated above. It was also found that with individual weights on the brushes, that when the bias was increased in an attempt to achieve a faster return of the brush to the commutator when the motor had slowed down, that this caused a high wear rate on the brushes.

The brushes without weights tend to track much better on the commutator than those with weights. In contrast, where the brushes have individual weights a heavier force is required to cause the brush to track properly on the irregularities on a typical commutator. Thus, to provide better tracking on brushes having the individual weights, they must be biased a greater and excessive amount and this causes the excessive wear problem.

In an alternate embodiment, the present invention eliminates the problems indicated above by providing centrifugally operable weights which at a predetermined excessive speed move outwardly, causing a rotating commutator to move axially away from non-rotating brushes.

In the prior art, bearings for motors as those described above have tended to loosen on the shaft to permit or cause vibration and noise, the latter being a particularly undesirable feature in a toy phonograph. In combination with the motor employing the present invention in the integral motor governor, there is provided a bearing which solves the foregoing problems by having jaws forming the bearing surfaces fit on the motor shaft, the bearing surfaces being lubricous. This arrangement prevents both the undesirable vibration and noise.

SUMMARY OF THE INVENTION

The invention includes the centrifugally actuated governor in integral combination with a motor having a commutator. Also in combination with the motor is a new bearing structure.

Objects of the invention are to provide an improved governor for electric motors, an improved motor bearing, an improved electric motor in combination with the governor and an improved motor in combination with the bearing.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 5 is a cross-sectional view of the motor and governor, illustrating another embodiment of the invention;

FIG. 6 is a view similar to that shown in FIG. 5 with the governor in operation to shut off the power to the motor;

FIG. 7 is a cross-sectional view, taken as indicated along line 7—7 as indicated in FIG. 5;

FIG 8 is a cross-sectional view, taken along line 8—8 as indicated in FIG. 5;

FIG. 9 is a fragmentary cross-sectional view of the motor shown in FIG. 5 having a bearing according to the invention; and FIG. 10 is a perspective, partially cut away and exploded view of the bearing shown in FIG. 9.

DESCRIPTION OF THE PREFERRED EMBODIMENTS

Referring again to the drawings, there are shown in FIGS. 1-4 a motor, generally designated as 10 and an integral governor within the motor, generally designated as 11.

Figure 4:
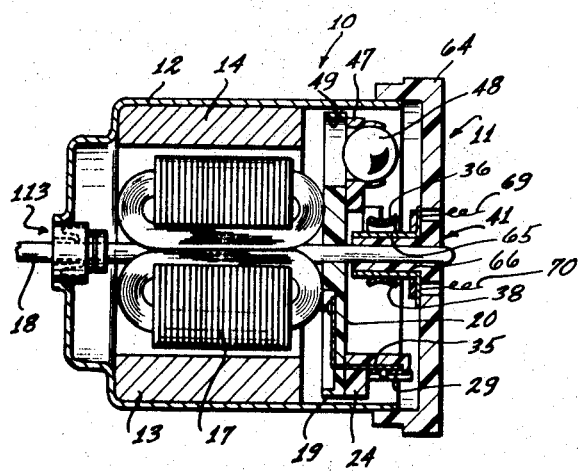
FIG. 4 is a cross-sectional side view of the motor and governor taken along the line 4—4 as indicated in FIG. 2.

The motor 10 is comprised of a magnetic housing 12 having two permanent magnets 13 and 14, a rotor 17 having three coils and poles mounted for rotation on a shaft 18. A non-conductive governor base plate 19 is secured to the shaft 18 for rotation with rotor and formed on a face 20 the plate 19 are three brush supports 23, 24 and 25, spaced annularly at 120°, and supported thereon are outer ends 26, 29 and 30 of brushes 31, 32 and 33, respectively. Electrical leads, such as 35 as shown in FIG. 4, extend from the brushes through the plate 19 to connect the brushes to their respective coils. The inner ends 36, 37 and 38 of the brushes are normally adapted, in their rotation, to ride on a stationary commutator generally designated 41.

Figure 2:
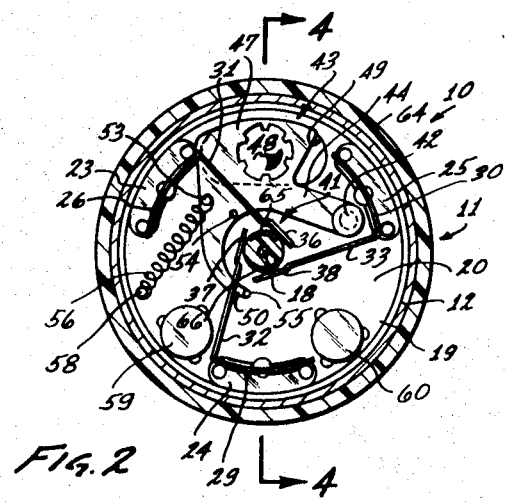
FIG. 2 is a cross-sectional view of a governor according to the invention, taken along the line 2—2 as indicated in FIG. 1.
Figure 3:
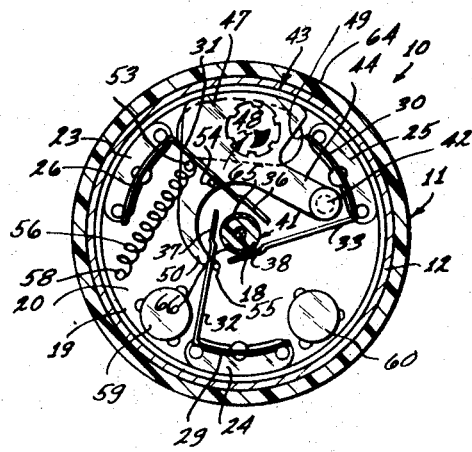
FIG. 3 is a view similar to that shown in FIG. 2 but with the governor in operation to shut off the power to the motor.

Pivotally supported at 42 to the base plate 19 is a centrifugally operated, nonconductive arm or member, generally designated at 43. The member 43 is generally parallel to the surface 20 of the plate 19 and when pivoted at 42 moves generally outwardly over the surface 20 from which it is spaced for such movement. Extending from the pivoted portion at 42 is a connecting portion 44, as best seen in FIGS. 2 and 3, and from which extends a main body portion 47 which carries a weight 48 in the form of a ball bearing. The plate 19 has an opening 49, as best seen in FIG. 4, to permit the movement of the weight 48 which extends below the face 20. Extending from the main body portion 47 is a pin supporting extension 50 having three pins 53, 54 and 55, extending outwardly therefrom at right angles. One end of a coil spring 56 is secured to the pin 53 and the other end of the spring is secured to a pin 58 extending upwardly from the plate 19. The spring 56 holds the centrifugally operated member 43 in its normal position and the strength of the spring predetermines the centrifugal force required to cause the arm 43 to be rotated outwardly by the force on the weight 48 as the arm pivots at 42. The pins 54 and 55 are positioned so that when, due to the excessive rotation of the motor, the force of the spring 56 is exceeded by the centrifugal force on the weight 48, causing the member 43 to move outwardly, they move so as to cause the brushes 31 and 32 to move away from the commutator simultaneously so as to cut off the power to the motor. As soon as the motor slows down the spring 56 rapidly pulls the arm 43 back into its normal position so as to permit the brushes to re-engage the commutator in their normal contacts. The brush 33 is unaffected by the action of the arm 43 and remains in contact with the commutator at all times.

Also supported outwardly on the plate 19 are two balancing or compensating weights 59 and 60 which balance the rotor and governor mechanism during normal operation, compensating for the addition of the governor weight 48.

Figure 1:
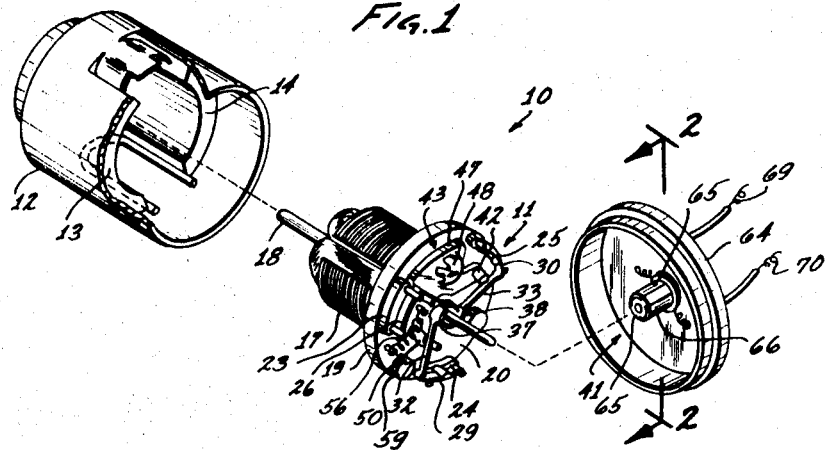
FIG. 1 is an exploded, perspective view of the motor and governor according to the invention.

The inverted commutator 41 is supported on a non-conductive motor housing cap 64, as best seen in FIGS. 1 and 4. It has two segments 65 and 66, each extending 120° of a full circle, directly opposite each other. The two segments are shown, for example, for use with the three-pole rotor. The segments 65 and 66 are connected to leads 69 and 70, as shown in FIG. 1, and which in turn are connected to the power source. The power to the motor is thus supplied to the commutator, through the brushes and through the brush leads 35 to the respective poles of the rotor.

In operation, when the motor tends to exceed a predetermined speed, the weight 48 on the governor causes the arm 43 to move outwardly against the force of the spring 56 and causes pins 54 and 55 to move against an intermediate portion of the brushes to cause them to move off of the commutator and break the brush-commutator contacts to shut the power off from the motor. The motor then immediately starts to slow down, causing the arm 43 to move inwardly and the brushes to resume their contacts with the aid of the spring 56. As indicated above, in the arrangement shown, the making and breaking of the brush-commutator contacts can occur at the rate of two hundred or three hundred times per second. This results in a very smooth controlling action and substantially positively controls the speed of the motor as desired.

The other advantages of this invention are that the two brushes, 31 and 32, are tied together mechanically to assure simultaneous cutoff of the current to all the poles and from which is achieved a sharp governing point. Further, the integral governor uses fewer parts than a conventional governor and eliminates a voltage drop that normally exists across a set of contacts. In this arrangement the Coulomb (dry) friction in the moving of the brushes is very low so that there is very little time lag between the speed and the motion of the weight 48. Work done (force times distance) in activating the governor mass is not large enough to affect the speed of the rotor, and the mass of the brushes is small so that they establish contact with the commutator without bouncing. As may be seen in FIG. 4 the inner surface of the brush ends are curved or tapered outwardly so that the commutator may be easily moved between the brush ends when the cap is placed upon the motor housing.

It should be noted that two brushes are all that is required for a three pole motor in this embodiment and that in a five pole motor contact would have to be broken simultaneously with three brushes in order to shut off all of the current to the motor.

In FIGS. 5-7 there is shown another embodiment of the invention. The motor here is essentially the same as that shown in FIG. 1, having three poles. In this governor embodiment, the latter is formed on a hub 76 adapted to rotate with the shaft 18. Extending radially outwardly from the hub, spaced 120° apart, are three weight supporting arms 77, 78 and 79. At the outer end of each arm is a resilient or spring-hinge connection 82, 83 and 84, formed by reducing the thickness of the governor material, metal or plastic, for example, at the ends of the radial arms. Integrally extending from the ends of the arms are weights 85, 86 and 87. The weights are thus supported radially at their respective one ends 90, 91 and 92. The other and heavy ends of the weights 94, 95 and 96, as best seen in FIG. 7, are free to move outwardly when the motor overspeeds to create a sufficient centrifugal force to cause the weights to so move on their resilient connections 82, 83 and 84.

Extending radially and outwardly axially from an intermediate portion of the weights are three radial connecting spring arms 97, 98 and 99. At their radially inwardly and axially outwardly other ends, as at 100 in FIGS. 5 and 6, they are connected to a nonconductive central portion or boss 101, adapted to rotate with the shaft 18, and by means of a key and slot arrangement indicated, are adapted to move axially on the shaft. However, this key and slot arrangement is not necessary in that the commutator is adequately rotated by the governor structure alone. The arms 97, 98 and 99, similar to the outer ends of the arms 77, 78 and 79, have reduced portions at their ends as 100 and 103, shown in FIGS. 5 and 6, to permit the boss 101 to move axially inwardly toward the rotor when the weights are acted upon centrifugally to move outwardly, and when the excessive centrifugal force is reduced by the slowing of the motor, to move the boss axially outwardly within the housing away from the rotor. This latter action is accelerated by means of a coil spring 106, surrounding the shaft and extending between the hub 76 and the boss 101, as shown in FIG. 5.

Extending axially outwardly from the boss 101 is a three segment commutator 107, one segment being connected to each of the respective poles by means of leads, as 111, as shown in FIGS. 5 and 6. In this situation the commutator rotates in the normal manner with the rotor, as well as the governor. Axially outwardly of the commutator is a nonconductive cylindrical extension 102 which receives the brushes when the commutator moves away from them by the action of the governor.

As shown in FIGS. 5, 6 and 8 there are two brushes 108 and 109. In this arrangement current is normally supplied from the power source through leads, as 110 and 111, through the commutator and to the poles. Here again the cap 112 is nonconductive.

In operation, when the motor speed exceeds the predetermined desired or allowable speed, the governor weights move radially outwardly, the resilient arms 97, 98 and 99 are moved axially toward the rotor, the commutator 107 is similarly moved axially on the shaft to break the contact with the stationary brushes 108 and 109. As soon as the motor slows to a proper desired speed, spring 106 urges the boss 101 and the commutator back into contact with the brushes. Here again the brush ends are curved or tapered so as to permit the easy movement of the commutator from its extension 102 back into contact with the brushes. Although in this situation the brush ends are held apart at substantially the same diameter as that of the commutator by the extension, as shown in FIG. 6. The arrows in FIGS. 5 and 6 indicate the relative movements of the commutator axially on the shaft.

This embodiment of the invention has substantially the same advantages as the previous one in that the axial movement of the commutator breaks contact with both of the brushes simultaneously so as to shut off the current to the motor. In this embodiment the governor is balanced by having annularly spaced weights which form the mass which is acted upon by the excessive centrifugal force when the motor overspeeds. In both embodiments the simultaneous breaking of the contacts between the commutator and brushes provides a flat governing curve, that is, speed is always constant regardless of load or voltage fluctuations.

In FIGS. 9 and 10 there is shown a bearing, generally designated as 113, and is also shown in position in the motor combination in FIG. 6 on the shaft 18. The bearing is comprised of a generally cylindrical housing 114 and at the outer end thereof are four rib members 115, each of which supports one of four annularly spaced jaws 116. The jaws, ribs and housing are integral and are made of Delrin, an acetyl plastic, having lubricous surfaces. The outer end surface 117 of the housing and those of the ribs and jaws are substantially flush.

The ribs 115 extend axially for a relatively short distance between the jaws and housing, this distance being less than one-quarter of the axial length of the jaws. The ribs extend annularly for less than half of the annular ouer surface of each jaw. The short length of the ribs in both directions provides a resilient support for the jaws within the housing. The inner surface 118 of the housing is generally cylindrical and is spaced from the outer surfaces 119 of the jaws. The jaws are tapered so as to have their smallest effective diameter at the inner end 120 of the housing. At the inner ends 121 of the jaws are annular bearing surfaces 122. These bearing surfaces, as shown in FIG. 9, fit on and support the shaft without clearance. The lubricity of the material makes this arrangement possible. In order to properly tension the surfaces 122 on the shaft and O-ring 123 of elastomeric material is forced inwardly from the end 120 of the bearing and into the space provided between the housing and the outer surfaces of the jaws. This O-ring may be positioned in an annular groove in the outer surfaces of the jaws or it may merely be forced between the inner surface of the housing and the outer surfaces of the jaws where it will tend to remain in the proper place so as to maintain the proper tension on the shaft. The O-ring is generally positioned axially outwardly of the actual bearing surfaces so that it can apply an inward force where the jaws are relieved at 124. That is, the jaws have a relatively short bearing surface 122 and the remaining inner surface of them in the axial direction has a larger effective diameter so as to be spaced from the shaft.

It has been found that the O-ring acting as a compressions means on the outer surfaces of the jaws easily and satisfactorily puts the proper tension on the bearing surfaces and on the shaft. With this arrangement the shaft cannot whip and vibration and the resulting noise is eliminated. The bearing may be cemented in the opening in the housing surrounding the shaft or may be held in place by the use of typical snap rings.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example. We do not wish to be restricted to the specific forms shown or use as mentioned except as defined in the accompanying claims, wherein various portions have been separated for clarity of reading and not for emphasis.

What is claimed is:

1. A governor for a motor having a rotor on a shaft, a commutator having contacts and at least two brushes engageable with said commutator contacts, comprising:
   elongated arms mounted at one end to a support and having their other ends engaging said commutator contacts and serving as said brushes, first resilient means biasing said arms to press said other ends against said commutator with light uniform pressure;
   centrifugal weight means rotatable with said rotor and movable thereon to move generally radially outwardly in response to rotation;
   second resilient means urging said centrifugal weight means to move inwardly; and
   means responsive to outward movement of said weight means by a predetermined amount to relatively move said brushes and commutator out of electrical contact, independently of the bias applied to said arms by said first resilient means.

2. The invention according to claim 1 wherein:
   said last means move said brushes radially outwardly from said commutator.

3. The invention according to claim 1 in which:
   said support is rotatable with said rotor and said commutator is stationary,
   said means responsive to movement of said weight means including means for moving said other ends of said arms simultaneously away from said commutator when said weight means move outwardly.

4. The invention according to claim 1 in which said centrifugal weight means includes:
   pin means supported thereon,
   said pin means being in contact with said arms whereby when said weight means is centrifugally operated said pin means moves said arms outwardly to break between said brushes and commutator.

5. The invention according to claim 4 in which:
   said arms are rotatable with said rotor and said commutator is stationary,
   said weight means being pivotally mounted on said rotor so that said weight means is pivoted away from said commutator when centrifugally operated at a predetermined rotor speed and said pins are forced against said arms to break said contacts.

6. The invention according to claim 5 in which:
   said rotor includes balancing means for compensating for said weight means.

7. The invention according to claim 1 in which:
   said support is stationary and said commutator rotates with said rotor,
   said last named means being operably connected to said commutator for moving said commutator axially away from said brushes when said weight means is centrifugally operated.

8. The invention according to claim 7 in which said last named means includes:
a hub rotatable with said rotor and having radial portions extending outwardly from said hub, and
said weight means being resiliently connected to the outer ends of the radial portions, said weight means being mounted for movement outwardly by centrifugal force.

9. The invention according to claim 8 in which said last named means includes:
a central portion connected to said commutator and slidably mounted on the motor shaft with said commutator,
radially directed arm means connecting said central portion with said weight means,
said arm means and said central portion being axially spaced,
said arm means being resiliently connected to said central portion and said weight means so that when said weight means is moved outwardly the central portion is moved axially toward said hub to move said commutator contacts axially away from said brushes.

10. The invention according to claim 9 including:
biasing means between said central portion and said hub to maintain normal contact between the commutator contacts and the brushes.

References Cited
UNITED STATES PATENTS

| | | | |
|---|---|---|---|
| 1,011,774 | 12/1919 | Haddrell | 310—68.5 |
| 2,057,525 | 10/1936 | Horning | 310—68.5 |
| 2,733,395 | 1/1956 | Luther | 310—66 |
| 2,812,454 | 11/1957 | Buck | 318—325 |
| 2,814,770 | 11/1957 | Tourtellot | 310—68.5 |
| 3,278,777 | 10/1966 | Grooms | 310—240 |

WARREN E. RAY, Primary Examiner

R. SKUDY, Assistant Examiner

U.S. Cl. X.R.

310—68